(12) United States Patent
Kirk, III

(10) Patent No.: US 11,050,905 B2
(45) Date of Patent: Jun. 29, 2021

(54) SYSTEM FOR LIVE STREAMING AND/OR VIDEO RECORDING OF PLATFORM TENNIS MATCHES

(71) Applicant: Haddon Spurgeon Kirk, III, Winston-Salem, NC (US)

(72) Inventor: Haddon Spurgeon Kirk, III, Winston-Salem, NC (US)

( * ) Notice: Subject to any disclaimer, the term of this patent is extended or adjusted under 35 U.S.C. 154(b) by 0 days.

(21) Appl. No.: 16/150,895

(22) Filed: Oct. 3, 2018

(65) Prior Publication Data
US 2019/0109966 A1    Apr. 11, 2019

Related U.S. Application Data

(60) Provisional application No. 62/568,585, filed on Oct. 5, 2017.

(51) Int. Cl.
*H04N 5/225*   (2006.01)
*H04N 21/218*  (2011.01)
*H04N 5/247*   (2006.01)

(52) U.S. Cl.
CPC ......... *H04N 5/2252* (2013.01); *H04N 5/2251* (2013.01); *H04N 5/247* (2013.01); *H04N 21/21805* (2013.01)

(58) Field of Classification Search
CPC ............ H01L 27/14609; H04N 5/3532; H04N 5/2353; H04N 5/37452; H04N 5/3742; H04N 5/3559; H04N 5/355
USPC .................................................. 348/373–375
See application file for complete search history.

(56) References Cited

U.S. PATENT DOCUMENTS

| | | | | |
|---|---|---|---|---|
| 3,904,193 A | * | 9/1975 | Patterson | E01C 13/045 472/94 |
| 5,436,811 A | * | 7/1995 | Hecking | A01G 25/00 239/279 |
| 6,442,293 B1 | * | 8/2002 | Ito | G01C 11/06 345/419 |
| 8,573,565 B1 | * | 11/2013 | Lyndaker | A63B 71/0054 256/23 |
| 2005/0012023 A1 | * | 1/2005 | Vock | A63B 24/0003 250/206.1 |
| 2011/0254973 A1 | * | 10/2011 | Nishiyama | G06T 13/80 348/222.1 |

(Continued)

OTHER PUBLICATIONS

Reinhard Penzel, "JD and Multi-Media Production: FIFA World Cup 2014", posted date Oct. 20, 2014, https://www.live-production.tv/case-studies/production-facilities/hd-and-multi-media-production-fifa-world-cup%E2%84%A2-2014.html (Year: 2014).*

(Continued)

*Primary Examiner* — Lin Ye
*Assistant Examiner* — Chan T Nguyen
(74) *Attorney, Agent, or Firm* — Robert W. Pitts

(57) ABSTRACT

A system for generating continuous video of a sporting event such as a platform tennis match includes a plurality of cameras mounted adjacent to and stabilized by uprights located on the periphery of the court on which the sporting event is played. Small cylindrical cameras are mounted in alignment with small openings in a screen or other barrier defining the periphery of the court, such as the "chicken wire" surrounding a platform tennis court so that action can be recorded without obstruction by the fence or barrier even as the fence or barrier is deflected as the sporting event is played.

24 Claims, 15 Drawing Sheets

(56) References Cited

U.S. PATENT DOCUMENTS

| | | | |
|---|---|---|---|
| 2015/0185591 A1* | 7/2015 | Jorgenson | G03B 17/561 |
| | | | 396/428 |
| 2016/0183604 A1* | 6/2016 | Pillarisetty | G06K 9/6215 |
| | | | 348/36 |
| 2017/0068147 A1* | 3/2017 | Truesdale | G03B 17/561 |
| 2017/0280841 A1* | 10/2017 | Lopez Avila | G06Q 10/00 |
| 2018/0137363 A1* | 5/2018 | Campagnoli | G06K 9/00671 |

OTHER PUBLICATIONS

Reinhard Penzel, "JD and Multi-Media Production: FIFA World Cup 2014", posted date Oct. 20, 2014, https://www.live-production.tv/case-studies/production-facilities/hd-and-multi-media-production-fifa-world-cup%E2%84%A2-2014.html (Year: 2004).*

* cited by examiner

SYSTEM FOR LIVE STREAMING AND/OR VIDEO RECORDING OF PLATFORM TENNIS MATCHES

CROSS REFERENCE TO PRIOR APPLICATIONS

This application claims the benefit of prior U.S. Provisional Patent Application 62/568,585 filed Oct. 5, 2017.

FIELD OF THE INVENTION

This application relates to apparatus, including cameras, and methods for live streaming of athletic contests and specifically to video streaming of platform tennis matches.

BACKGROUND OF THE INVENTION

Platform tennis is a racquet sport derived from tennis, developed in 1928.

The court 1 is about one-fourth the size of a traditional tennis court and is surrounded by a "chicken wire" fence twelve feet high. Each opening 5 in the chicken wire fence or screen 4 is hexagonal, and the width of each hexagon is about one inch. The taut screens 4 allow for balls that originally land within the lines of the court to rebound off them and remain in play. As shown in FIG. 1, the screens 4 surround the court with corner uprights 2 and intermediate uprights located on the periphery of the court 1. Upper end beams 7a and upper side beams are mounted on top of and are supported by intermediate uprights 3 along each end of the court. Upper side beams 8a are similarly supported by intermediate uprights 3 located along each side of the court. Lower end beams 7b and side beams 8b extend between corner uprights 2 and are attached to intermediate uprights 3. Screens 4 along each end and along each side are secured at the top by upper end and side beams 7a and 8a respectively. The bottom of the end and side fences 4 are secured to end and side beams 7b and 8b. The screens 4 are taut, but are not directly supported by intermediate uprights 3. The screens 4 are attached through a diagonal chicken wire section from the bottom to the top of each corner upright 2. FIG. 1 is a drawing of a platform tennis court 1, showing positions of cameras 21, 21a and 21b suitable for streaming and recording video in the system comprising the preferred embodiment of this invention.

What makes the sport difficult to capture on video is the fact that all the action takes place behind the 12 foot wire screen 4, which often makes the action hard to see.

Most people would just shot from outside the screens and accepted the obstruction that they provided. Sometimes this worked fairly well, and sometimes it didn't as shown in FIG. 2.

Another common system for shooting important platform tennis matches has been to build a scaffold or rent a "cherry picker" to allow a camera to shoot down over the top of the screens at a steep angle, and thereby lessen or eliminate the impediment of the screens.

There are a number of problems with this approach. First, it's expensive. Second, it creates a significant impediment for the spectators who want to watch the action live. Third and most important, a shot from over the top of the screens 4 provides a view from which you have no way to tell the height of the ball as it goes over the net, which is a key element of the sport. As a result, this angle provides a fairly poor view of the action.

One option for providing an improved view of the action is to employ "through the screen" shooting technology. The essence of this technology is to use a small lens camera, and to position it close enough to the screen such that the camera is able to essentially look right through one of the holes in the screen.

Such a system can provide an unobstructed view of the action, with the camera, such as a small battery powered miniature camera or Gopro camera 10. (shown in FIG. 4A) centrally positioned on one of the ends of the court. However, such an approach has serious drawbacks. First, such a system could only be utilized on courts where there is access to the ground in the space immediately behind the court, in order to support the camera 10 from a steady foundation, if the camera support is separate from the court structure. This is very frequently not possible. Often an aluminum walkway or deck is positioned immediately behind the court, and these generally vibrate and shake from the on-court action. Also, many courts have a playing surface that is up to nine feet or so above the level of the ground immediately behind the court. For the system to work in that type of situation, it would require the positioning of the camera to a tolerance of ⅛" or so in all three dimensions, while it was being supported by the end of a pole reaching seventeen feet or so into the air. That would be an extremely difficult feat to achieve.

The uprights or posts 3 supporting the wire screen 4 might however be used to support the camera 10. The camera 10 has to be positioned very precisely in all three dimensions in order to allow the screen to become invisible when shooting through the screen. Both the screens 4 and the uprights 3 of the court are subject to continuous and dramatic vibration due to the movement of the players and collisions of players and balls with the screens.

The screen 4 itself, relative to which the camera 10 has to be positioned so precisely, frequently bows outward by up to five inches or so in response to a collision of a player with the screen. That means that a camera 10, which moves with the screen, must be able to recede by up to five inches to accommodate the severe bowing of the screens which can result from a forceful collision of a player into the screens, as shown in FIGS. 3A and 3B. And after that it must immediately snap back to its very precise positioning with relation to the screen and to a particular hole within the screen. To counteract this problem, a spring type mechanism would need to be employed to permit the camera 10 to move several inches in response to a collision, and then snap right back into its original position.

The action can be seen quite clearly with this approach as long as the players nearest the camera are at net. But when they inevitably move to the backcourt, the camera generally won't be able to show the players in all areas of the backcourt, and thus won't be able to provide a useable shot. That situation would occur roughly half the time.

Another significant problem with this approach is that it never provides a good view of both the server and the serve returner at the start of a point One or the other of them will almost always be out of the picture, as shown by shaded areas in FIG. 4D.

This problem could feasibly be lessened by switching the small battery powered sports or Gopro camera's "Field of View" setting from "medium" to "wide". But that would give you a picture with much smaller players and much more "wasted space" in the picture. And it would also introduce a significant "rounding" distortion of the sort you see in a "fisheye" type picture.

For through the screen technology to become viable, the problem of the vibrating uprights 3 would have to be solved, because supporting the cameras from the ground would never be a workable and robust solution.

In addition, the view provided by the through the screen cameras would have to improved so that they could provide a clear and compelling view of the server and the returner at the beginning of each point.

SUMMARY OF THE INVENTION

The preferred embodiment of this invention addresses at least three important problems in order to provide a better streamed video image for events, such as platform tennis matches. Supporting a camera by corner uprights satisfactorily eliminates vibration problems. By diagonally orienting a small corner mounted camera with a small lens the camera can shoot through openings in the screen surrounding a platform tennis court, providing a better field of view, without interference of the screen wires defining a screen opening. Through the screen corner mounted cameras can also transmit video signals to and can receive control signals from a remote production site, without introducing obstructions adjacent the platform tennis court.

According to this invention continuous video signals of a platform tennis match played on a court can be generated. A platform tennis court, on which this invention can be employed, includes a screen that is supported by corner uprights located on each corner of the court and intermediate uprights located between adjacent corner uprights An assembly according to this invention generates continuous video of a platform tennis match played on this court. This assembly comprises at least one camera mounted close to the screen and adjacent to one of the corner uprights to limit movement of the camera during the platform tennis match. This camera is fixed to the corner upright, but not to the screen. At least one camera is aligned at an acute angle relative to a plane of an opening in the screen adjacent to the corner upright so that the at least one camera can cover action on the court by shooting through the screen and the opening in the screen, despite movement of the screen. With this assembly, the screen will not interfere with continuous streamed or recorded video.

A method according to this invention can generate continuous, streamed video of a platform tennis match played on a court surrounded by a screen supported by corner uprights located on each corner of the court and intermediate uprights located between adjacent corner uprights. This method comprises the steps of attaching a camera support to one of the corner uprights and mounting a camera directly on the camera support so that the camera is fixed to the corner upright, but not to the screen. This camera is diagonally aligned with an opening in the screen adjacent to the corner upright in close proximity to the screen so that the camera is unobstructed by the screen even as the screen moves during the platform tennis match and shooting action in the platform tennis match through the screen.

A camera assembly for generating continuous video of an outdoor sporting event comprises a camera including a cylindrical body with a cylindrical non distortion lens in a lens housing mounted at a front surface of the camera. The camera body is secured and housed in a relatively rigid cylindrical tube with the lens located at one end of the cylindrical tube. A waterproof covering at least partially surrounds the lens housing and the one end of the cylindrical tube. A camera housing supports the rigid cylindrical tube to mount the camera to a relatively rigid member located on the periphery of the court.

BRIEF DESCRIPTION OF THE DRAWINGS

FIG. 7 shows a cylindrical lipstick style camera assembly in which a cylindrical camera housing has been positioned within a cylindrical tube and including a lens small enough to be positioned in an opening in a screen of the type surrounding a platform tennis court.

FIG. 8 is a view showing the cylindrical camera assembly positioned within a camera mount housing, but with the top of the housing removed to show the cylindrical tube extending therethrough.

FIG. 9 is a rear view of the through the screen camera subassembly showing the manner in which the lipstick style camera is secured within the outer tube.

FIG. 10 is a rear view of the through the screen camera assembly, including cables with the camera locked in one end of the outer tube.

FIG. 11 is a view showing the camera subassembly of FIG. 10 mounted in a camera mount with the outer tube extending through the camera mount.

FIG. 12 is a rear view of the camera assembly of FIG. 11 with a hose enclosing cables extending from the camera assembly to prevent water from fouling the camera.

FIG. 13 is a top view of a through the screen camera mounted to a corner post at an acute angle so that the lens can be positioned at an acute angle and can shoot through one of the screen openings without obstruction of the angled lens.

DETAILED DESCRIPTION OF THE PREFERRED EMBODIMENT

Figure 1:
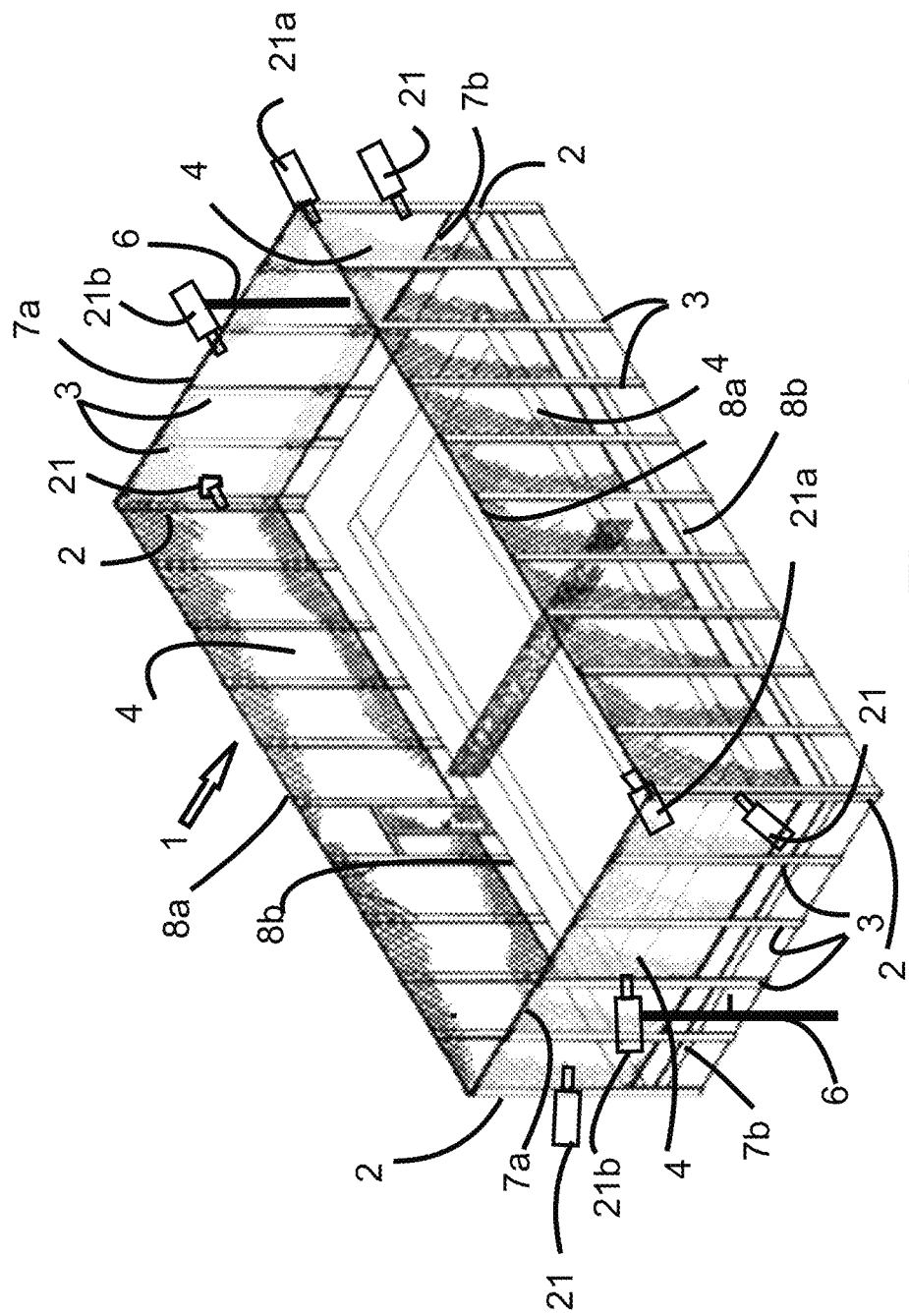
FIG. 1 is a view of a platform tennis court showing the positions of through the screen cameras, high mounted corner cameras and external cameras that can be used to stream video of platform tennis matches according to the preferred embodiment of this invention.
Figure 2:
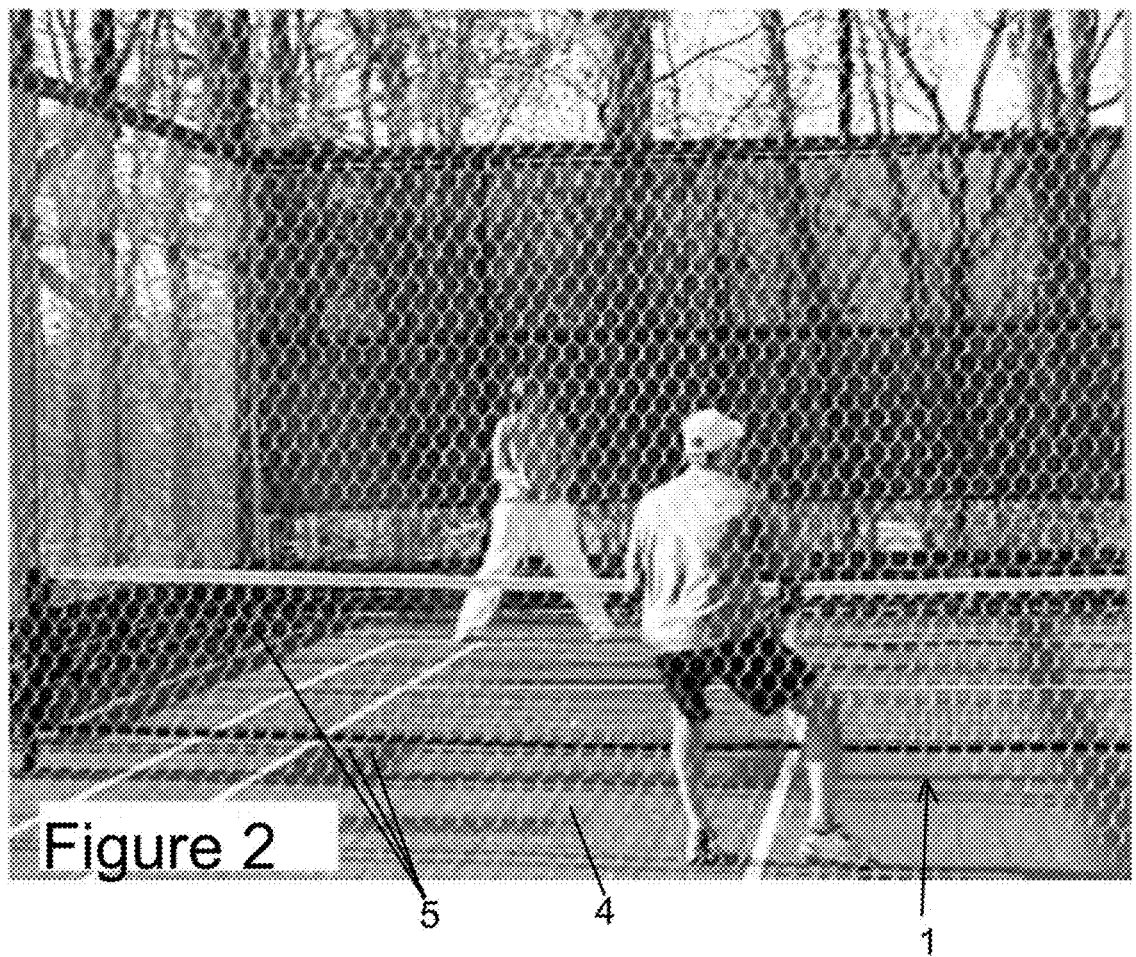
FIG. 2 is a view of an image that would be captured using prior art methods to stream video in which the wire screen surrounding a platform tennis court detracts from the image of the action on the court.
Figure 3A:
FIGS. 3A and 3B are images showing the deformation of the screen surrounding a platform tennis court which often occurs during a platform tennis match when a player runs into the screen.
Figure 3B:
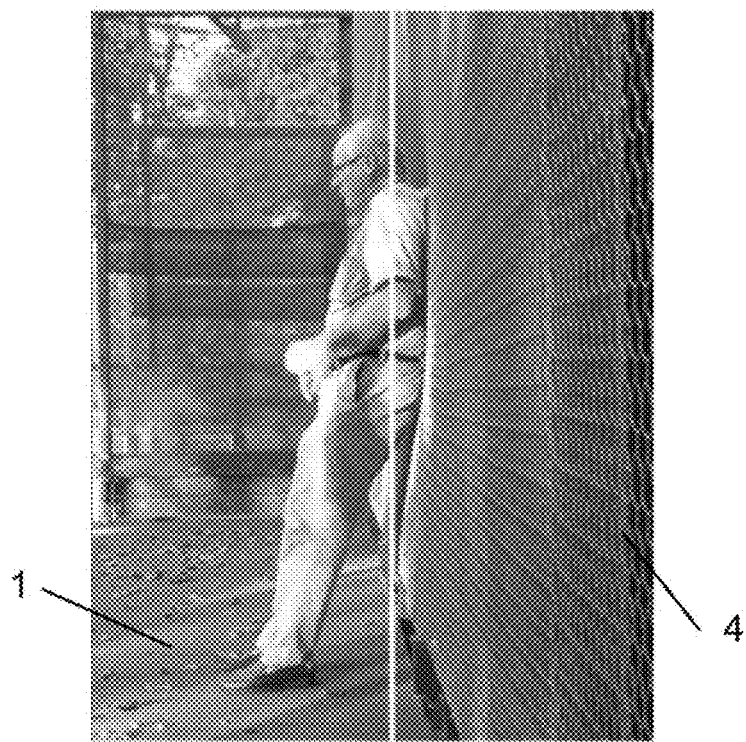

My invention involves new methods, techniques and apparatus that I have created for solving the vibration problem so that the uprights could support non-vibrating cameras for through the screen shooting. This breakthrough made the widespread adoption of through the screen shooting feasible.

Unlike the interior uprights 3, the corner upright 2 supporting the screen 4 is stable and remains substantially free of vibration when a player collides with the screen 4 at any point along the periphery of the court 1. This relative stability is due not only to the fact that the corner uprights 2 can be more securely mounted on the ground or substrate, but also because the corner upright 2 is attached to screens 4 on both the relatively perpendicular ends and sides of the court. The intermediate beams 3 support the upper beams 7*a* and 7*b*. When a player hits one of the fences, the upper beams 7*a* and 8*a* will be deflected, which in turn will cause motion or vibration of the intermediate uprights 3. However each corner upright is joined to beams on one end and one side so that movement of the corner uprights 2 is restricted and the corner uprights remain stable. Therefore the corner upright 2 can be relied upon to eliminate, or at least sufficiently reduce, vibration if the through the screen cameras 21 are mounted exclusively, or primarily, on the corner uprights 2. While all of the other uprights 3 vibrate dramatically, the corner uprights 2 are more stable.

Miniature sports cameras or Gopro cameras 10 of the type previously referred to, are not able to shoot diagonally through the screens from the corner without interference from the screen and therefore would not be mountable adjacent to the corner of the courts. Therefore, shooting from the corner would not have appeared to be feasible, without visual interference from or overlap by the screen 4, and attempts to use cameras 10 that are large relative to the screen opening 5 did not make it apparent that the lack of vibration by the corner uprights 2 would make it feasible to mount a camera 10 in that position. Positioning a camera in this position is still desirable because the corner uprights 2 are relatively free of vibration, and a camera supported by a corner upright 2 would also not vibrate.

As an additional bonus, there is another advantage to mounting cameras from the corner upright 2. The bonus is that if the camera is mounted very close to the corner, so that you no longer have to worry about the "bowing" effect of the screens. That's because the corner of the screen 4 is held almost completely still, regardless of the bowing that might occur closer to the middle of the screen 4.

At the corners, the platform tennis screens 4 are held almost completely stationary by braided steel wires that hold the back platform tennis screen, the side platform tennis screen, and a small diagonal "tensioning" platform tennis screen locked tightly together. The small diagonal platform tennis screen is connected to the back of the corner upright 2 so that the corner upright is spaced from the platform tennis screen as shown especially in FIG. 14.

The bottom line is that the most the back screen would ever bow outward near the corners where we mount through the screen cameras would be less than a quarter of an inch, compared with nearly five inches in the middle of the screen 4.

In the preferred embodiment of this invention multiple cameras can be positioned around the court. Through the screen cameras 21 would typically be mounted at a height of about six feet on each of the corners. A camera 21*a* mounted on top of the rail which surrounds the court 1 is mounted at a height of slightly over twelve feet.

If the lens 24 used on a through the screen corner camera 21 mounted at six feet are relatively small, an outward bowing of that amount wouldn't cause the screen to collide with the camera or lens at all. The wires forming the screen opening 5 would surround the lens 24 and move relative to it, but they wouldn't collide with the lens 24 or interfere with the picture.

Figure 4A:
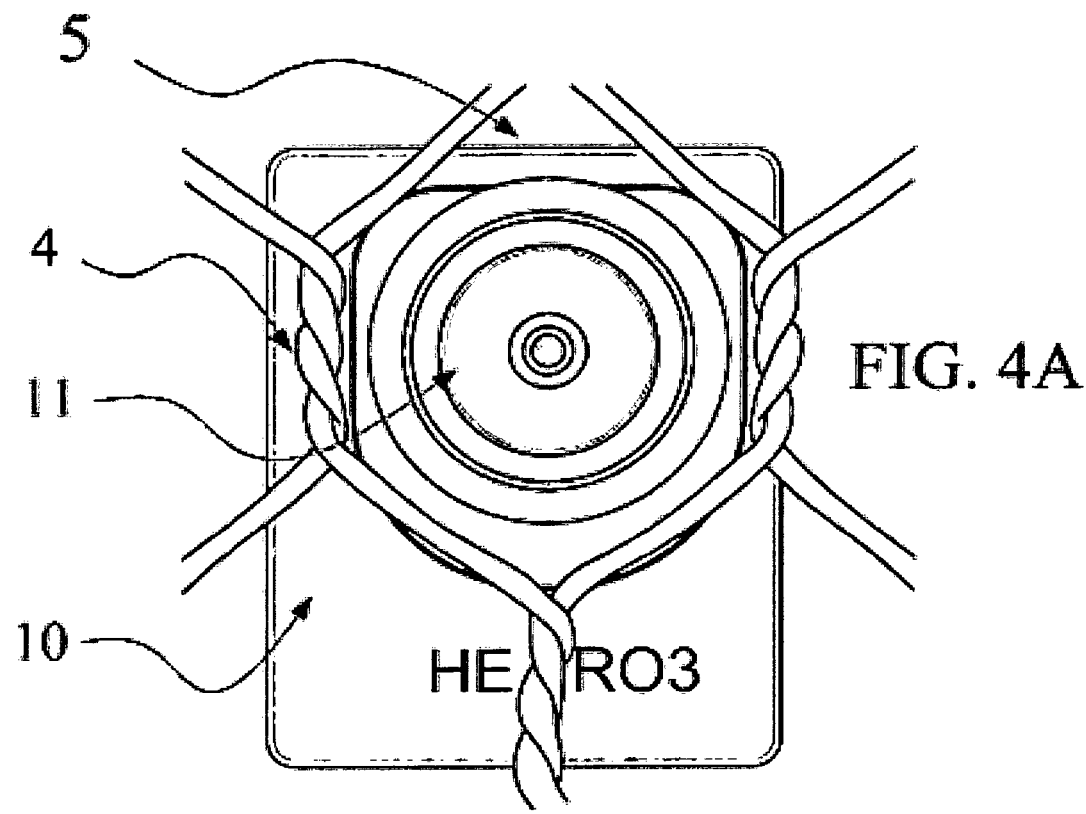
FIG. 4A is a view of a battery operated miniature sports camera, which has a lens and lens housing approximately the same size as an opening in the wire mesh or "chicken wire" screen surrounding platform tennis court. Although this camera is small enough to shoot through a screen opening, deflection of the screen can interfere with the image and it may be necessary to spring load this camera when the screen is deflected.
Figure 4B:
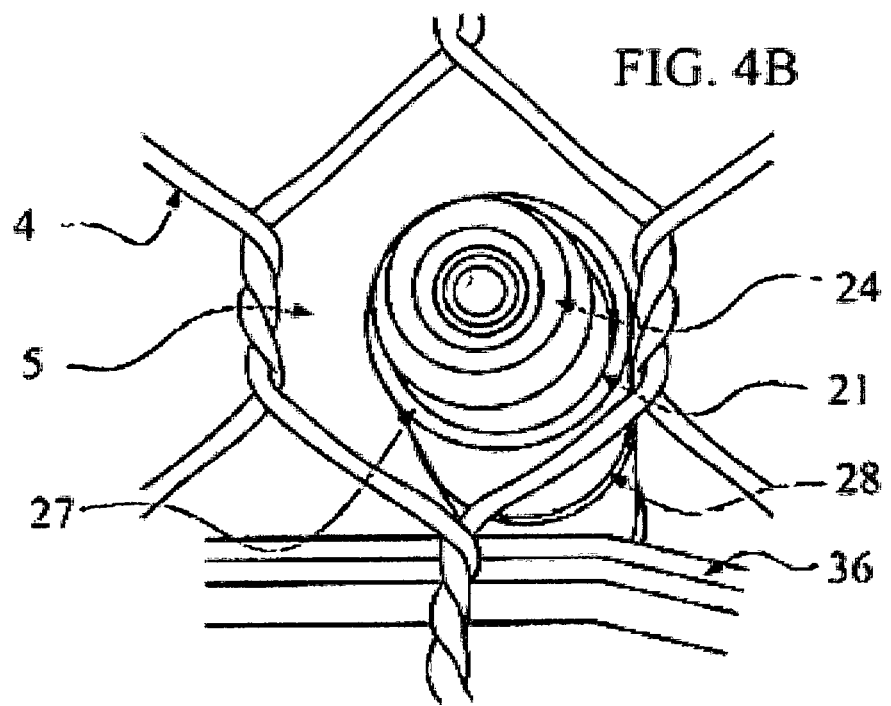
FIG. 4B shows a "lipstick" style camera" in which the camera lens is significantly smaller than the screen opening. The small size of this "lipstick" style camera lens makes is possible to position the camera at an acute angle relative to the screen and the uprights supporting the camera so that the screen itself will not significantly detract from the streamed image shot through the screen, even if the screen is deflected during action.
Figure 4C:
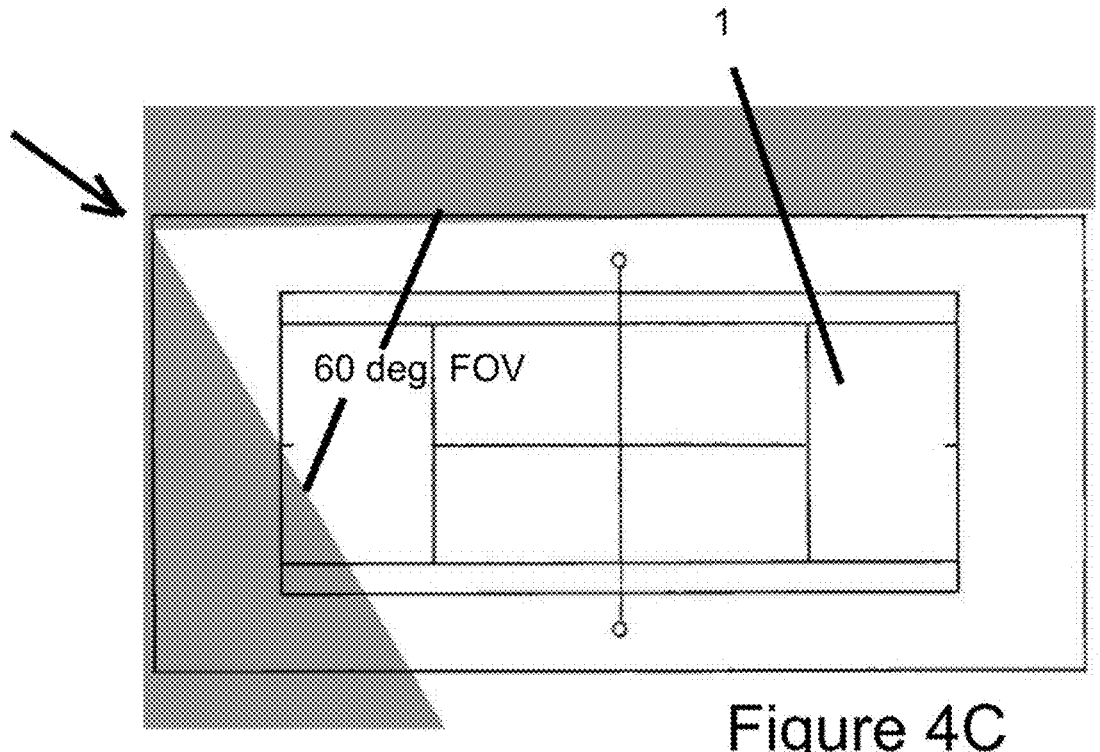
FIG. 4C shows the field of view of a camera mounted at one corner of a platform tennis court and shooting through the screen. The shaded portion identifies the areas that are not within the field of view of such a through the screen camera.

The battery powered miniature sports camera or Gopro cameras 10 are not able to shoot diagonally due at least in part to the relatively large size of the lens 11 and the camera 10. A modified Marshall camera 21, to be subsequently described in more detail, equipped with a Ragecam 2.8 mm lens will be capable of diagonal through the screen shooting due to the lens's size relative to the screen openings 5, and the protrusion or the lens 5 at the front of the camera. This makes it possible to point this camera from its corner mount, as shown in FIG. 4B at the proper angle to capture a great view of most of the court as seen in FIG. 4C. An angled camera shooting from the corner can pick up everything from the corner on the opposite end of the side screen, all the way to just past the center mark along the near side baseline. That provides an extremely useful range of coverage.

A larger battery operated miniature sports camera 10 would be completely unable to operate effectively from the corner. Its shape, the small length that its lens extends from its body, and the large diameter of its lens itself would all prevent it from shooting through the screen at a significant angle, which is what needs to be done to obtain the best view from the corner.

Figure 4D:
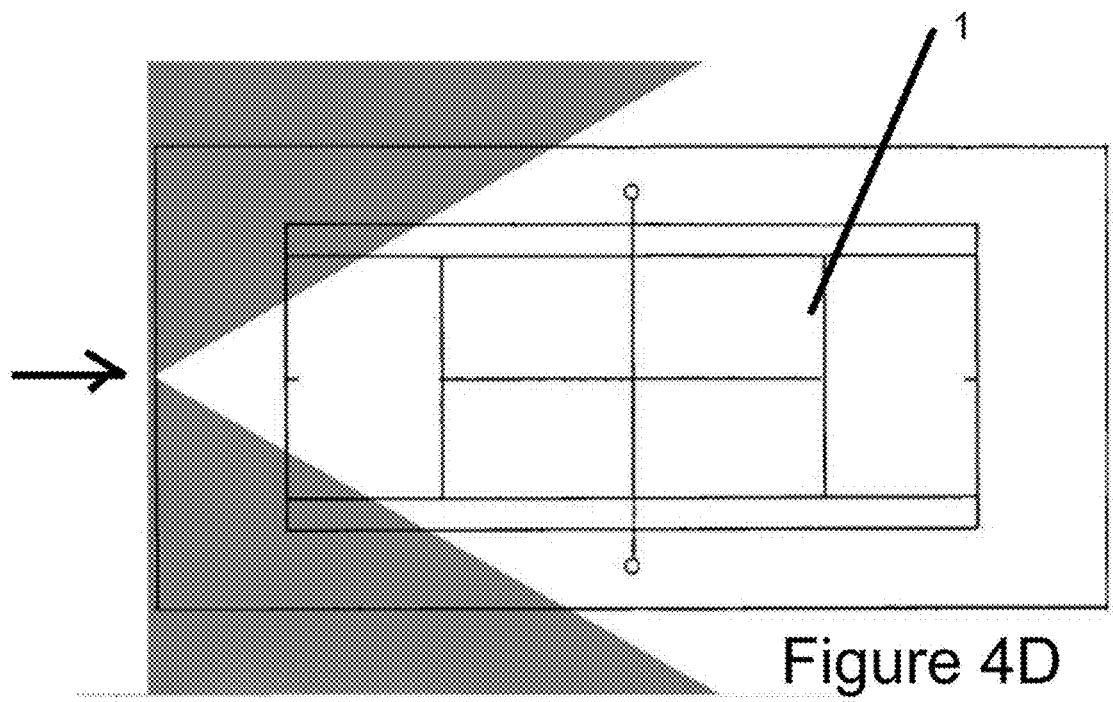
FIG. 4D shows the field of view from a through the screen camera mounted in the center at one end of a platform tennis court. The shaded area shows the areas that are not within the field of view of this camera.
Figure 4E:
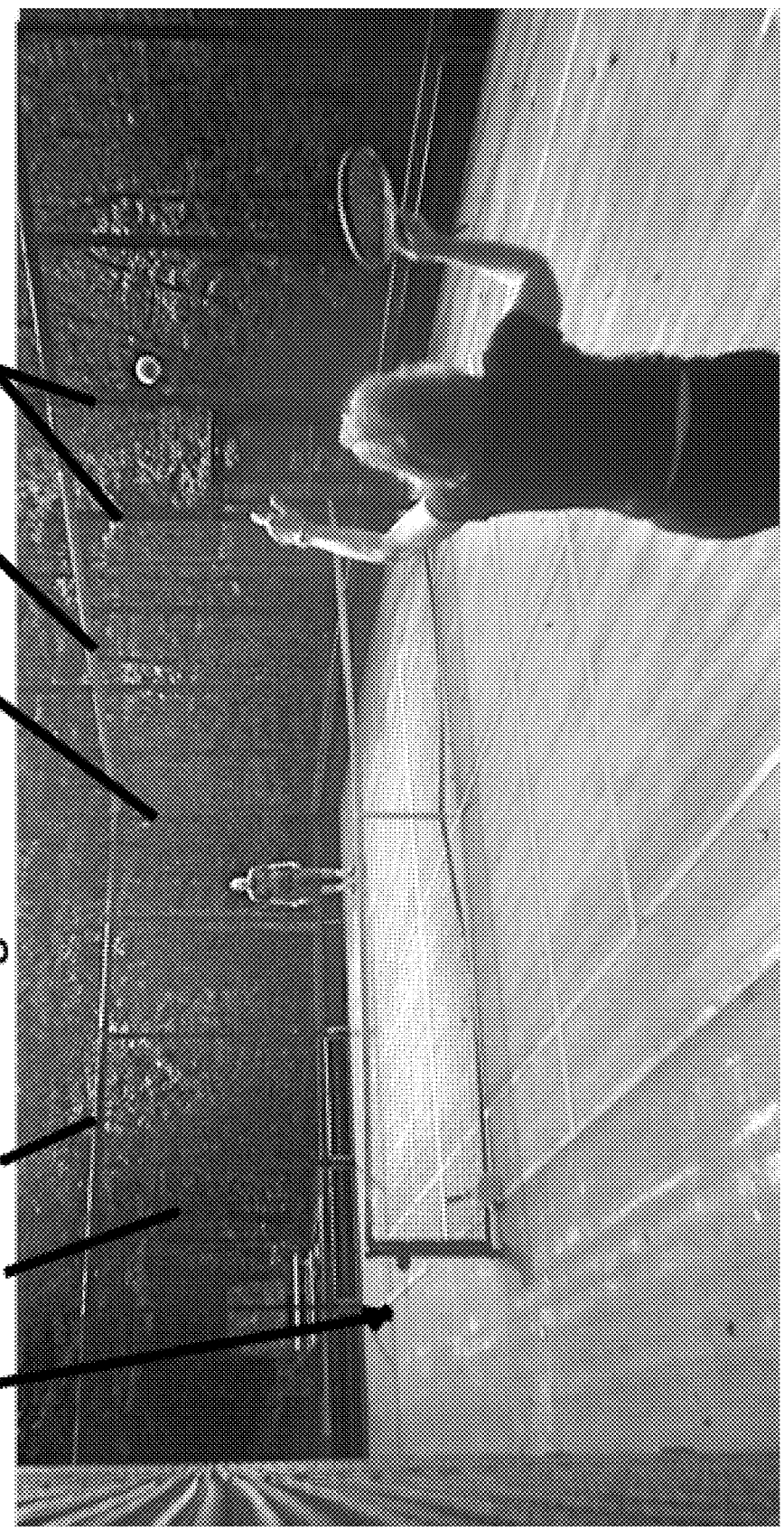
FIG. 4E is an image from a through the screen camera, such as that shown in FIG. 4B mounted at a corner of the platform tennis court with a field of view shown in FIG. 4D. The screen does not interfere with this image as in FIG. 2.
Figure 5:
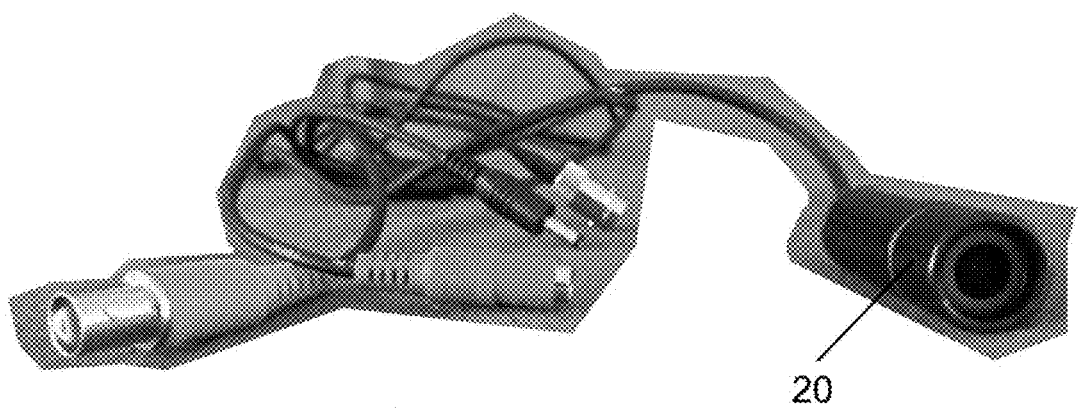
FIG. 5 is a view of standard a Marshall Electronics CV200-MB lipstick camera showing an original equipment or factory lens. Modifications of this camera are necessary in order for use as a through the screen camera a shown in FIG. 4B.
Figure 6:
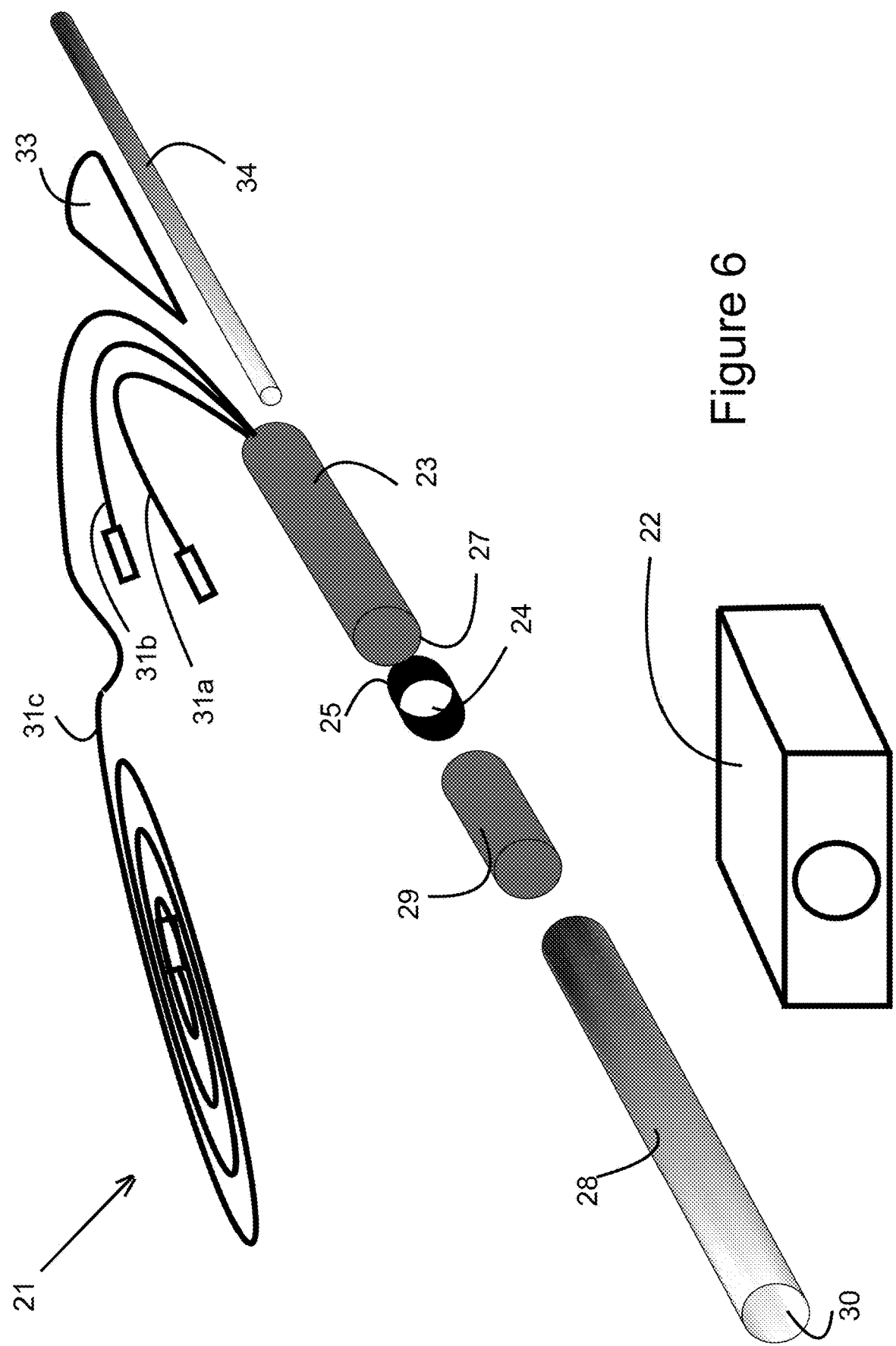
FIG. 6 is an exploded schematic view of a lipstick camera illustrating the modifications made in the preferred embodiment to permit the use of a lipstick style camera as a through the screen camera as shown in FIG. 4B. The components shown in FIG. 6 are shown merely for illustration and are not intended to depict the structure of the individual components and are not to scale.
Figure 7:
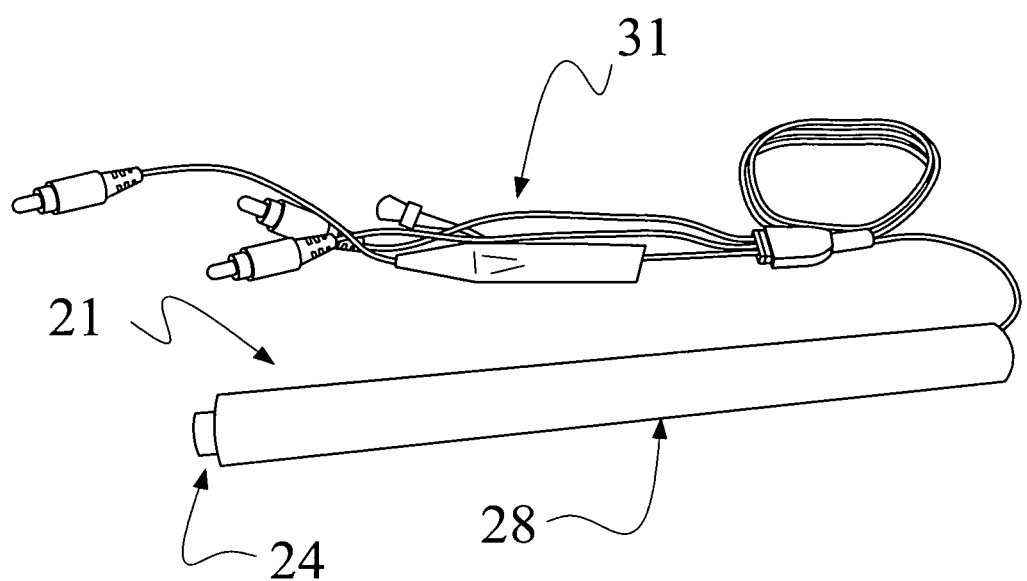
FIGS. 7-13 more clearly show the actual components.
Figure 8:
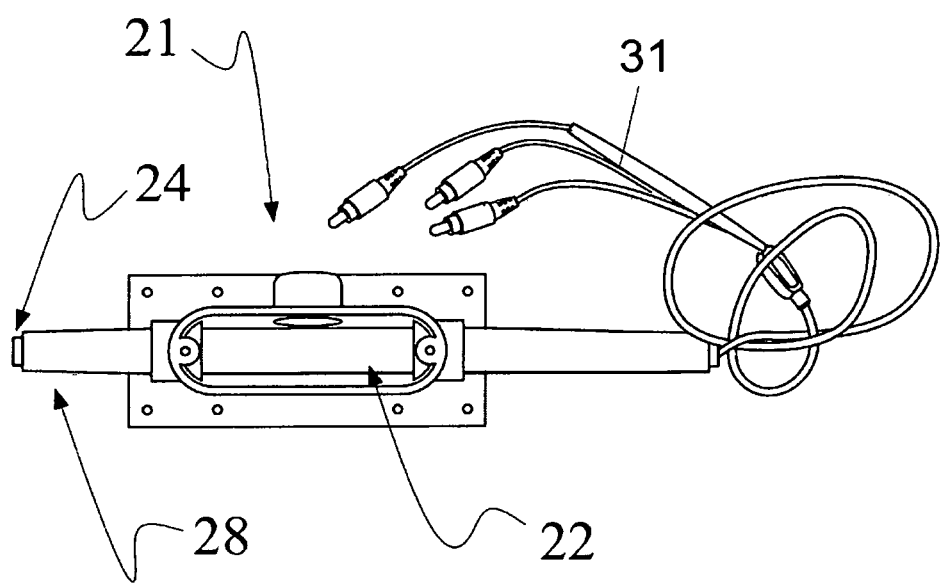

For comparison, FIGS. 4C and 4D show the areas of the court visible with the preferred embodiment compared to the areas visible with the larger battery operated miniature sports camera 10 centrally mounted at one end of the court.

The centrally mounted through the screen battery operated miniature sports camera 10 would only show the near-side server if he or she decided to serve from very near the middle line, which doesn't occur very often.

Approximate sizes of the lenses and the screen openings for the preferred embodiment of this invention are as follows:

Ragecam lens—13 mm diameter
Gopro lens—22 mm diameter
Width of the screen openings—25 mm or approximately one inch.

Initial experimentation with a miniature sports, Gopro-style camera 10, assumed that a through the screen camera would have to be positioned perpendicular to the screen. There were several reasons for this: First the lens of a Gopro camera 10 is large, and just barely fits within the screen's opening. See FIG. 4A. This made the idea that the camera could be "angled" seem unfeasible. Second the Gopro lens barely sticks out from its body at all, thus making an angled shot physically impossible, because at any significant angle the camera body would collide with the screen. The battery powered miniature sports camera 10 was not designed to be powered externally for long periods, and it was not designed to output a video signal for long periods. Furthermore the miniature sports camera 10 was not designed to be controlled remotely though a wire, and it could not be relied upon to function properly for hours on end as a camera feeding a switcher.

Mounting a smaller through the screen camera at a corner also eliminates or sufficiently reduces the "bowing" problem of the screens. A camera mounted near the middle of the court needs to be able to recede by five inches or so, and then immediately pop back to its original position. That would require a "spring" type mechanism to accomplish this, which involved fitting one tube snugly through another tube, with a rubber band allowing the inner tube to recede by several inches and then to snap back to its original position.

The heart of the preferred embodiment of this invention is that I have invented two practical ways to mount a camera from the uprights of a platform tennis court, and they both solve the twin problems of vibration, and screen movement.

The vibration problem is rooted in the fact that all of the uprights 3 except for the corner uprights 2 vibrate constantly while play is underway. This is due to both the movement of the players on an elevated platform court 1 and the collisions of players and balls against the screens 4. The vibration is dramatic enough such that without vibration cancellation, the picture from a camera supported by the uprights 3 would be completely unusable due to the shake.

The through the screen cameras 21 used in the preferred embodiment of this system can have the following characteristics. This cylindrical camera 21 is a modified version of a Marshall Electronics CV200-MB ("the Marshall") camera 20. This camera looks like a lipstick with cables 31 including individual cables 31a, 31b and 31c extending from the back. Cameras 20 or 21 of this type are commonly referred to as lipstick or bullet cameras and have a cylindrical camera body 23 with a lens 24. The cylindrical camera 21 employed in the preferred embodiment of this invention has never been used for platform tennis before.

This camera 20 uses small lenses 24 that can be switched out, so that the same camera body 23 could be used for camera 21, 21a and 21b. It is suitable for all shots and angles either through the screen 4 or mounted above the screen 4, which helps all the various cameras to "look" the same.

The lenses 24 with this cylindrical camera 21 are all small, so they are compatible with shooting through the openings in the screen.

Unlike a relatively larger battery powered miniature sports camera 10, the cylindrical cameras 21, 21a and 21b are designed for shooting hour after hour while providing an HD-SDI high quality output.

By contrast, the larger battery powered miniature sports camera 10 is designed primarily to record its signal rather than to output it to a switcher. Also, the larger battery powered miniature sports camera 10 only has an HDMI output, which is difficult to transmit over distances exceeding fifty feet or so. Since cylindrical cameras 21 can transmit a video signal up to two hundred feet or more, they are much better suited for a situation where the cameras need to feed a switcher at a production site which could be two hundred feet or so away so that the production site does not obstruct site lines of fans attending a platform tennis match.

The cylindrical camera 21 is completely compatible with a Blackmagic Atem Production Studio 4k switcher with 10 HD-SDI inputs.

With modifications that I have made to the cylindrical camera 21, its functions and settings are remotely controllable by joystick at a production site up to two hundred feet away. This is a huge factor, because most small cameras are only controllable by buttons or a joystick mounted on the camera itself. With the Marshall CV200-MB camera 20 forming the basis of the cylindrical camera 21, an operator can control eight or more cameras with a single joystick from a control panel located hundreds of feet away from the cameras.

The camera 20 comes from the factory with a lens that provides a semi-fisheye, distorted view of a platform tennis court, and it is thus poorly suited for streaming a platform tennis competition.

Three different types of cylindrical lens 24, one for each of the three types of "shots" that go into a shooting plan, can be employed in the preferred embodiment of this system. All of the lenses 24 used are small M12 mount lenses.

For the corner mounted through the screen (TTS) cameras 21, a 60d FOV 2.8 mm low distortion lens from Ragecam-.com is used.

For the corner mounted cameras 21a mounted at the south corners on top of the rail surrounding the court at a height of twelve feet, a DSL377A-650-F2.8 low distortion lens from Sunex.com can be employed. The FOV of these lenses is about 120d.

For the External Center Wide View shot cameras 21b, a 4.35 mm 72d FOV low distortion lens from Peau Productions is quite suitable.

These low distortion lens, all of which are referred to as a cylindrical lens 24, minimize the distortion of the court or the action. Straight lines within the picture remain straight, and do not appear curved as they do with the lenses shipped from the factory with the standard Marshall Electronics CV200-MB camera.

Switching out the lenses renders the Marshall cameras no longer water-resistant, and thus necessitates further modifications to counteract this problem.

The onscreen display "OSD" cable extends from the standard camera 21 to allow for remote adjustment of the camera settings. Unfortunately, this cable is shipped from the factory with a very unusual and hard to find connector on the end of it which interfaces with the accompanying factory shipped joystick.

There were no readily available long extender cables available that would interface with that connector, and since we needed to be able to control the cameras from up to two hundred feet away, the factory installed connectors were replaced by standard male RCA connectors. That allowed us to attach easily available RCA extender cables 31*c* to reach the distances we needed to reach.

Additionally, a short adapter cable which would interface on one end with the joystick was employed, and on the other end, with the male RCA connectors that we had attached to the cameras 21, 21*a* and 21*c*.

With the modifications to the lenses 24, the standard lens protector would no longer fit over new lenses, and thus the cameras and lenses were no longer waterproof. Waterproof or water resistance is critical for this application, because it frequently rains and/or snows during platform tennis tournaments.

The system employed in the preferred embodiment of this invention makes it possible to protect the cameras by housing them in metal cylindrical tubes 28 in which the cameras fit snugly inside.

Figure 9:
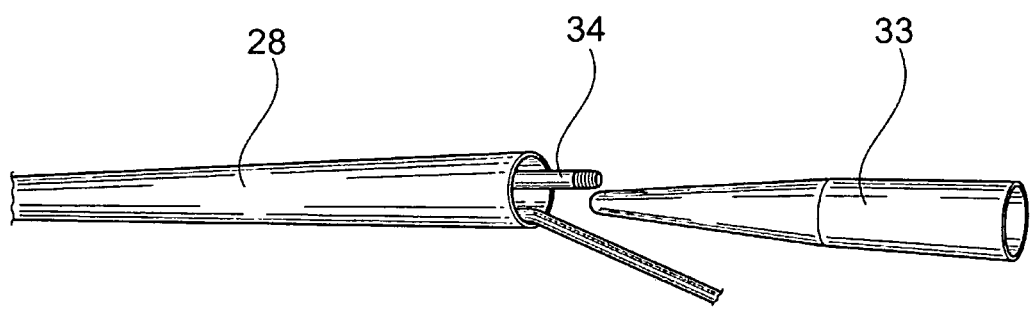
Figure 10:
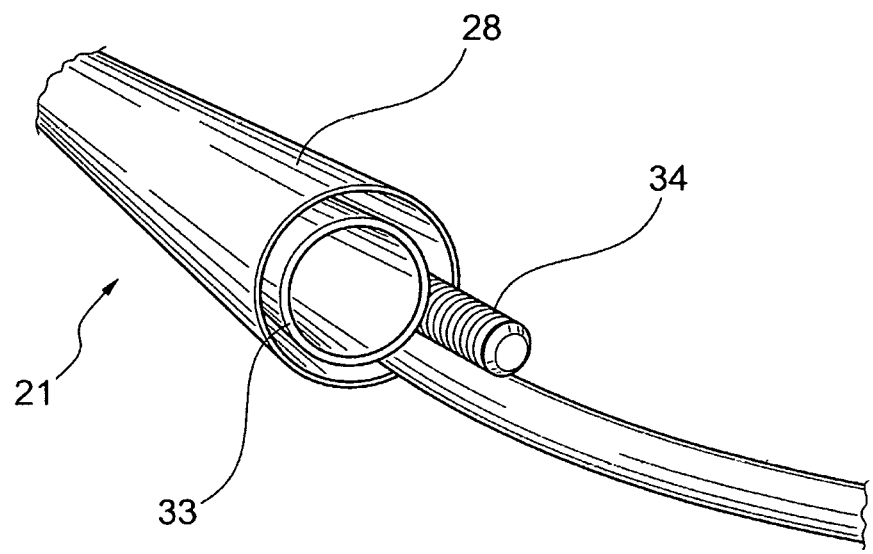

The cameras 21, 21*a* and 21*b* are stabilized within the tube 28 to keep them from changing position by means of a plastic cone or wedge 33 inserted into the tube 28, which wedges tightly against a threaded rod 34 attached on the end of the cylindrical cameras 21, 21*a* and 21*b*. FIG. 9 shows the wedging cone 33 before being wedged in. FIG. 10 shows the cone 33 after being wedged into the tube 28.

This system allows the cameras 21, 21*a* and 21*b* to be completely stable within the tube 28, but they still can be quickly removed for servicing without hassles over glue, caulk, etc.

When in use, the cameras 21, 21*a* and 21*b* are all always pointing downward at an angle to some degree. This makes it so that water does not flow into the tube on the end that has the camera lens.

The lenses 24, mounted in lens housings 25 for the through the screen corner camera 21 have narrow lenses, and it is helpful to allow these lenses 24 to stick out from the metal tube 28, because their small size allows them to remain untouched by the screen 4 if it bows slightly outward due to a player collision, and—their small size allows them to shoot at a diagonal angle through one of the openings 5 in the screen 4. If these thin lenses 24 are pushed back into the tube so that they're completely protected by the tube, both of these advantages would be diminished, because the width of the tube is significantly greater than the width of the lenses.

The preferred embodiment of this system utilizes three types of cameras 21, 21*a* and 21*b*, and they utilize different types of support and housing.

Figure 11:
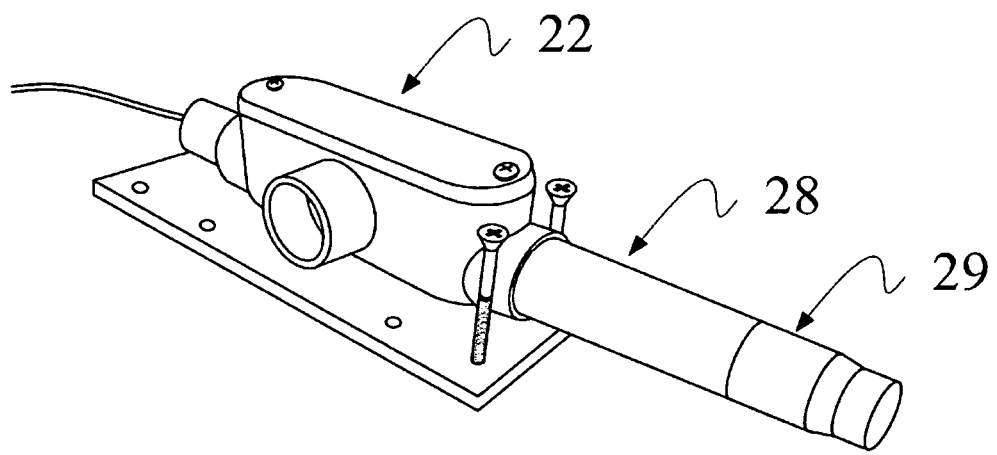

For the through the screen corner cameras 21, the metal tubes 28 are inserted through a Cantex ¾" plastic conduit box or camera housing 22. This box provides a flat base, and allows the camera tube 28 to be rotated so that the picture can be adjusted to perfectly horizontal when the junction box 22 is sitting flat. The plastic openings on either end are wide enough to accept the metal tube 28, but narrow enough to hold the tube 28 firmly in place once it's been rotated to horizontal. See FIG. 11.

Figure 13:
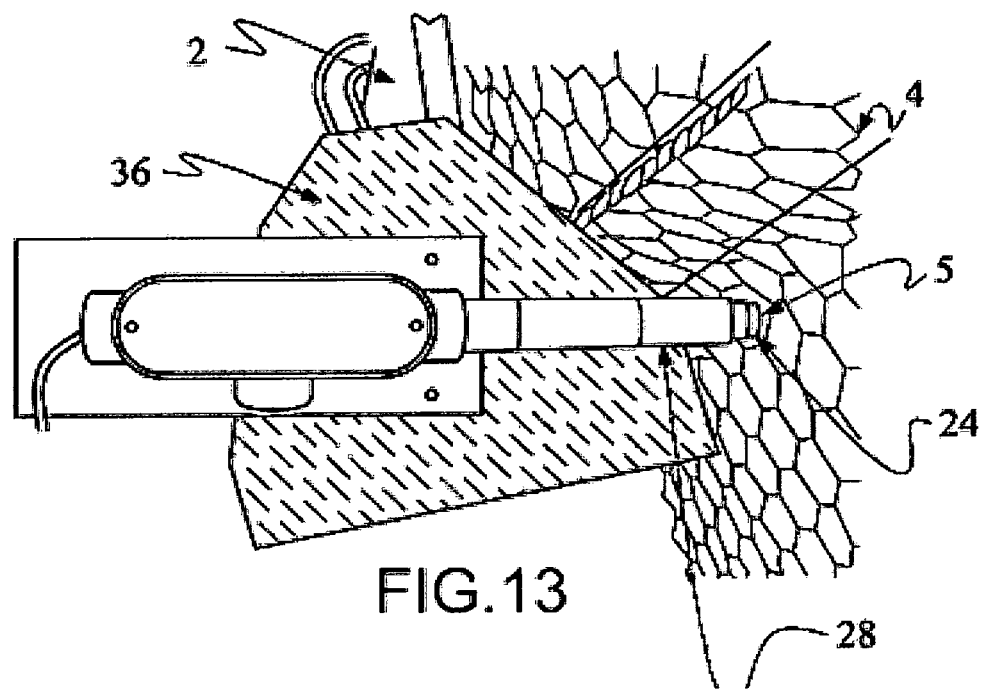
Figure 14:
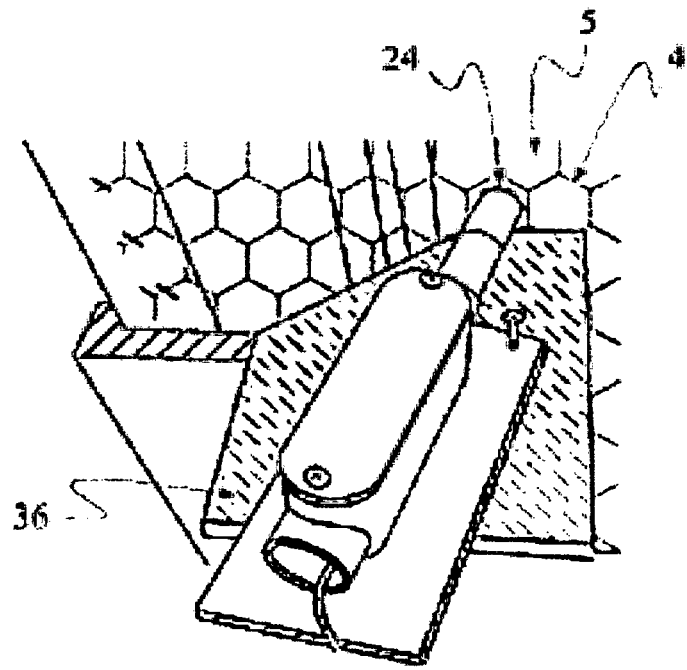
FIG. 14 is a rear view similar to FIG. 13 showing the angled orientation of the corner mounted through the screen camera.
Figure 15:
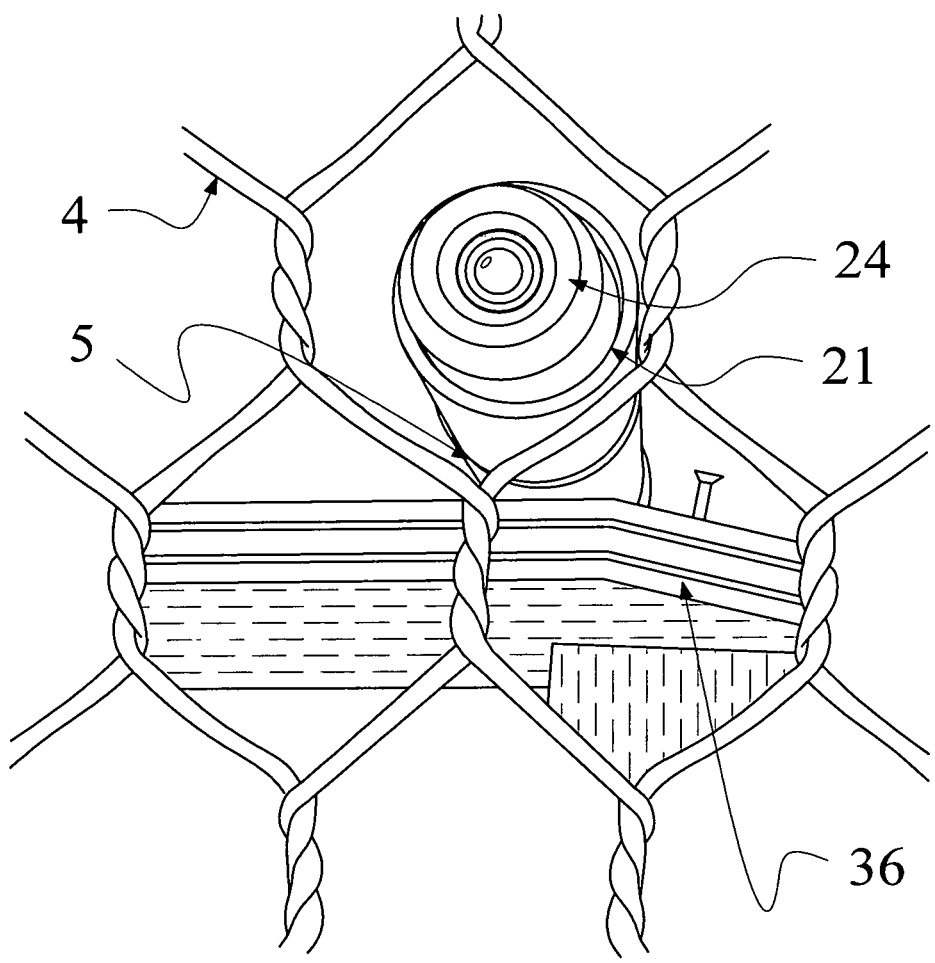
FIG. 15 is a view of the through the screen camera oriented diagonally at an acute angle relative to the screen and to an opening in the screen to achieve the field of view shown in FIG. 4C, and showing a support structure for mounting the through the screen camera in a fixed position to a corner upright to which the support structure can be attached.

The junction box or camera housing 22 itself is then glued to a thin, flat wooden slat, which allows the combined unit to be screwed in place to the top of the through the screen corner support structure 36 at the precise position and angle to provide a clean and perfectly aimed shot through an opening 5 in the screen 4 as shown in FIGS. 13 and 14. A wooden spacer inserted perpendicularly below the far end of the wooden slat at the appropriate point provides the ten degrees or so of "tilt" that are required for the best framing of the action. This angle is set to barely show the top of the far screens, but very little above that.

Figure 12:
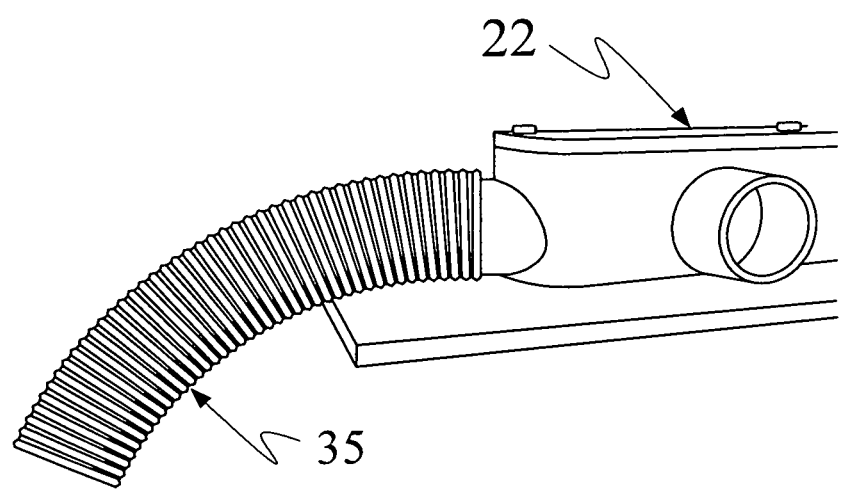

The back end of the camera unit is waterproofed by means of a hose 35 that fits snugly over the back of the junction box housing 22 and hangs down with the wires or cables 31*a*, 31*b* and 31*c* inside. See FIG. 12.

The front end of the camera 21 is waterproofed by covering the cylindrical lens 24 and lens housing 26 and the area where it meets the camera with shrink tubing or waterproof covering 29 that provides snug exterior protection for these vulnerable areas.

For cameras 21*a* mounted on the corners above the screen, the metal camera housing are inserted into 12"×¾" copper tubes, into which the metal housing fit perfectly, but with no friction between them. To hold them in the correct position relative to each other they have to be held in place with tape.

The copper tube is then held in place by an upper camera mount.

Telescoping chrome support tubes are cut quite short to keep the camera mounting height to a minimum. This is done to help get the camera 21*a* to slightly below the level of the top rail that encloses the court 1. The top of that rail is both unsightly and distracting. With the camera 21*a* slightly below the top of the rail, you only see the screens 4 and the court 1, which gives a much better look.

Telescoping tubes are glued to stand upright inside a ¾" metal plumbing flange which is itself screwed to a small piece of wood. The wood piece is then screwed in place onto a wooden Corner Top Platform. One of these can be attached to each of the South corners of the court in order to avoid glare from the sun.

The camera plan and switcher plan according to the preferred embodiment of this invention can have the following features. To most viewers, the through the screen corner cameras 21 usually provide the best view of the action. They provide an especially good view of the serve and return sequence which begins every point.

With four through the screen corner cameras 21 two cameras give a good view of Deuce side points, and two that give good views of Ad side points. Starting at a given point with the view from the standpoint of the server or the receiver, it is possible to mix in both of those views to provide variety.

When starting from the server's point of view, you are starting with a shot that will usually remain useable for an extended period of time, because most of the time, the serving team immediately takes over the net and keeps it for a number of exchanges. Thus, your beginning shot will remain useable until the other team takes over the net.

When the other team takes over the net, the director could switch between cameras at opposite ends of the court, which would bring all of the relevant action back into the screen. However, switching the direction of the shot is generally confusing to the viewer, and we like to avoid it. So instead of switching from a through the screen camera 21 on one end of the court to a camera 21 on an opposite end of the court, it is preferable to switch to a wider view shot from cameras 21*a* or 21*b* shooting in the same general direction.

The shots provided by the corner cameras 21*a* mounted on top of the screen and the external wide view cameras 21*b* are virtually interchangeable. They both serve the same purpose, which is to provide a "safe" overall view of the court when the shot from the through screen corner camera 21 becomes unusable all of a sudden due to a takeover of the net by the opposing team.

The high mounted corner cameras 21*a* technically don't cover the entire court, because they miss the corner right below them. As a practical matter though, the ball is rarely hit from within the area that the high mounted camera 21*a* misses, so we consider it a "safe" shot to cut to.

The high mounted corner cameras 21*a* plus external wide view cameras 21*b* may not both be necessary, except for variety. Most viewers like the shots produced by both.

Also, depending on the lighting conditions, the visual impediment provided by the screens 4 themselves can range from "negligible" to "very bad", and can sometimes limit the quality of the picture produced by the external cameras 21*b*, in which the screen 4 is visible.

Similarly, high contrast shadows on the court produced by direct sunlight can sometimes reduce the quality of the pictures produced by the high mounted corner cameras 21*a*, which will be shooting steeply downward into the shadows. Having more options is better than having fewer.

Virtually all platform tennis courts are laid out in an east to west configuration, and so the high mounted corner cameras are placed on the two SOUTH corners to keep the sun will behind them rather than in front of them. All matches are played in the Northern Hemisphere during cold weather months, so the sun always stays in the south.

The preferred embodiment, depicted herein, is merely representative of this apparatus and method of this invention, as well as the camera employed in both the apparatus and method. Modifications, especially those apparent to one of ordinary skill in art, can be made without departing from the invention as claimed herein. Furthermore additional modifications that may not be readily apparent to one of ordinary skill in the art can still incorporate this invention. This invention can also be employed for broadcasting as well as recording video and as well as for streaming video over the Internet or other network. Furthermore implementation of this invention in accordance with the following claims should be understood to include generating a video of portions of a platform tennis match, but not including periods of no activity in the match or generating edited video for applications, such as streaming, recording and broadcasting.

I claim:

1. An assembly for generating continuous streamable video of a platform tennis match played on a single court surrounded on four sides of the single court by a platform tennis screen supported by corner uprights located at each corner of the court and spaced from the corner of the platform tennis screen with intermediate uprights located between adjacent corner uprights, the corner uprights and the intermediate uprights extending between upper and lower beams, the assembly comprising the platform tennis screen, the single court, the corner uprights, the intermediate uprights and further characterized by at least one camera spaced between the upper and lower beams and mounted close enough to the platform tennis screen to shoot through an opening in the platform tennis screen without obstruction by the platform tennis screen and adjacent to one of the corner uprights to limit movement of the camera during the platform tennis match, with the corner upright acting to restrain the camera to isolate the camera from movement of the platform tennis screen, the at least one camera is aligned at an acute angle relative to a plane of an opening in the platform tennis screen and relative to the plane of the platform tennis screen adjacent to the one corner upright so that the at least one camera will cover action on the court by shooting through the platform tennis screen and the opening in the platform tennis screen despite movement of the platform tennis screen, wherein the camera is attached to the one corner upright outside of the platform tennis screen to provide a stable platform for the camera independent of the platform tennis screen and aligned with the opening in the platform tennis screen wherein rebound of the ball striking the platform tennis screen adjacent the one corner upright is unaffected by the camera attached to the one corner upright because the camera is positioned so that a ball will strike the platform tennis screen adjacent the corner upright, but not the camera.

2. The assembly of claim 1 wherein the platform tennis screen has openings defined by wire forming the platform tennis screen, and the camera is diagonally alignable at an acute angle with one of the openings and to the platform tennis screen to shoot through the platform tennis screen without obstruction by the wire forming the platform tennis screen despite movement of the platform tennis screen and so that opposing players, ball flight and most of both sides of the playing area remain unobstructed and in view of the at least one camera attached to the one corner upright.

3. The assembly of claim 1 wherein the platform tennis screen is formed of wire mesh with hexagonal openings, and the camera has a lens small enough to shoot through one of the hexagonal openings without interference of the wire forming the one hexagonal opening with which the camera is aligned.

4. The assembly of claim 3 wherein the hexagonal openings are characterized by a width of one inch.

5. The assembly of claim 1 wherein the camera has a lens with a field of view of sixty degrees.

6. The assembly of claim 1 further including a camera support attachable to one corner upright and supporting the camera at a position spaced from the one corner upright wherein the camera support is attached outside of the platform tennis screen.

7. The assembly of claim 1 wherein the camera includes a cylindrical body with a cylindrical lens in a lens housing mounted at a front surface of the camera, with the camera body being secured and housed in a relatively rigid cylindrical tube with the lens located at one end of the cylindrical tube, with a waterproof covering at least partially surrounding the lens housing and the one end of the cylindrical tube, and a mount on the rigid cylindrical tube for mounting the camera to a relatively rigid member located on the periphery of the court.

8. The assembly of claim 1 wherein the camera includes a non distortion lens.

9. The assembly of claim 1 wherein multiple cameras are mounted on separate corner uprights.

10. The assembly of claim 9 wherein the multiple cameras are electronically interconnected so that the continuous streaming video of a platform tennis match played on a court is generated by switching between cameras dependent upon action during the platform tennis match, video from the cameras being transmittable to a remote production site located at a distance so as not to visually obstruct action on the platform tennis court in order to switch between cameras.

11. The assembly of claim 1 for generating continuous streamable video of a platform tennis match wherein the one camera comprises a cylindrical camera member having a lens with a diameter less than the opening, the one camera being positioned on the outside of the platform tennis screen and being attachable to a surrounding member extending around the cylindrical camera member with the surrounding member in turn being rigidly secured to the corner upright so that the one camera is diagonally aligned with the opening in the platform tennis screen without the platform tennis screen obstructing the field of view of the one camera.

12. The assembly of claim 1 wherein the camera is attached to a cable and the cable transmits a video signal to a switcher at a distance greater than fifty feet, wherein the camera includes a cylindrical lens subassembly having a diameter no greater than one inch so that the platform tennis screen does not obstruct an image when the camera shoots through the opening in the platform tennis screen.

13. A method of generating continuous streamable video of a platform tennis match played on a single court surrounded by a platform tennis screen supported by corner uprights located on at each corner of the single court and spaced from the platform tennis screen intermediate uprights located between adjacent corner uprights, the corner and intermediate uprights extending between upper and lower beams, the method comprising the steps of attaching a camera support to one of the corner uprights and mounting the camera directly on the camera support spaced between the upper and lower beams so that the camera is fixed to the corner upright but not to the platform tennis screen so that the corner upright acts to restrain movement of the camera relative to the screen with the camera positioned outside of the platform tennis screen and diagonally aligning the camera with an opening in the platform tennis screen and a plane of the platform tennis screen adjacent to the corner upright in close proximity to the platform tennis screen to shoot through the opening in the platform tennis screen so that the camera is unobstructed by the platform tennis screen even as the platform tennis screen moves during the platform tennis match and shooting action in the platform tennis match through the platform tennis screen with the camera is positioned so that a ball will strike the platform tennis screen adjacent the corner upright, but not the camera.

14. The method of claim 13 wherein the camera is mounted at an acute angle relative to the corner upright on which it is mounted and to the platform tennis screen and the opening in the platform tennis screen.

15. The method of claim 13 wherein a plurality of cameras are mounted in the same manner to multiple corner uprights and further comprising the step of switching between different ones of the plurality of cameras for continuously streaming video.

16. The method of claim 15 further comprising the steps of mounting other cameras at corners of the court above the platform tennis screen.

17. The method of claim 13 wherein the camera is isolated from movement of the platform tennis screen due to collisions of players and balls with the platform tennis screen while balls remain in play during the platform tennis match.

18. The method of claim 13 for generating continuous streamable video of a platform tennis match wherein the camera comprises a cylindrical camera member having a lens with a diameter less than the opening, the camera being positioned, on the outside of the platform tennis screen, and being attachable to a surrounding member extending around the cylindrical camera member with the surrounding member being rigidly secured to the corner upright so that the camera is diagonally aligned with the opening in the platform tennis screen without the platform tennis screen obstructing the field of view of the camera.

19. A system for generating video of a platform tennis match comprising multiple cameras generating continuous streamable video of the platform tennis match, at least one of the cameras, comprises a corner camera being located outside of and adjacent a corner of a platform tennis screen surrounding a platform tennis court;

the platform tennis screen being deflectable during continuous action in a platform tennis match, with the platform tennis screens being stabilized by corner uprights spaced from the platform tennis screen to limit movement of the platform tennis screen adjacent corners of the platform tennis court including the corner where the corner camera is located, relative to portions of the platform tennis screen further remote from the corner uprights so that a corner upright adjacent to the camera acts to restrain the camera so that movement of the platform tennis screen does not impart movement of the corner camera and destabilize the video produced by the corner camera, which is angled diagonally relative to the platform tennis screen and to the court to shoot video through a corresponding aligned opening in the platform tennis screen, so that at corner camera covers action over the majority, but not all, of court action in any location on the platform tennis court and wherein another of the cameras covers action on portions of the court, not covered by the corner camera; and wherein the multiple cameras are connected to a common output so that video from different cameras can be selected to provide a continuous video stream of all of the action during a platform tennis match, and wherein:

the corner camera is attached to one of the corner uprights outside of the platform tennis screen and between a top and a bottom of the platform tennis screen with the one of the corner uprights providing a stable platform for the corner camera independent of movement of the platform tennis screen and the corner camera being positioned in alignment with the opening in the platform tennis screen.

20. The system of claim 19 wherein the corner camera is fixed to an adjacent corner upright.

21. The system of claim 19 including at least one of the multiple cameras is located remote from the corners of the platform tennis screen.

22. The system of claim 19 wherein more than one of the multiple cameras are located adjacent different corners of the platform tennis court.

23. The system of claim 19 for generating continuous streamable video of a platform tennis match wherein the at least one camera comprises a cylindrical camera member with a lens having a diameter less than the corresponding opening, the at least one camera being positioned, on the outside of the platform tennis screen and being attachable to a surrounding member extending around the cylindrical camera with the surrounding member in turn rigidly secured to the corner upright so that the at least the one camera is diagonally aligned with the corresponding opening in the platform tennis screen without obstructing the field of view of the at least one camera.

24. A streamable continuous video showing continuous play of a platform tennis match without interference of the video due to movement of the platform tennis screen during continuous play and without interference with a ball during the platform tennis match, the streamable, continuous video including continuous images from a camera located adjacent to a corner formed at the intersection of a side platform tennis screen section and an end platform tennis screen section, the side platform tennis screen section and the end platform tennis screen both forming parts of the platform tennis screen;

the camera being oriented at a diagonal angle relative to both the side and the end platform tennis screen intersection in the corner;

the camera being mounted in a stable position independent of movement of the platform tennis screens, intersecting to form the corner, are disturbed during play, but with an upright in the corner acting to restrain the camera spaced between a top and bottom of the platform tennis screen;

the camera being aligned with one opening in the platform tennis screen so that the platform tennis screen does not obstruct the field of view of the camera even when the platform tennis screen moves during continuous play;

the camera being located outside of the platform tennis screen, but close enough to the platform tennis screen so that no elements of the platform tennis screen sections are visible in the continuous images generated by the camera affixed to the corner post during continuous play;

whereby the streamable continuous video showing continuous play is generated from a diagonal orientation providing an improved view of a platform tennis match.

* * * * *